United States Patent
Gonzalez-Salvador

(10) Patent No.: US 7,127,774 B2
(45) Date of Patent: Oct. 31, 2006

(54) WIPER ARM AND BLADE ASSEMBLY HAVING TENSION INDUCING PROJECTIONS

(75) Inventor: Bernardo Gonzalez-Salvador, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/085,332

(22) Filed: Mar. 21, 2005

(65) Prior Publication Data

US 2006/0207051 A1  Sep. 21, 2006

(51) Int. Cl.
*B60S 1/38* (2006.01)

(52) U.S. Cl. .................... 15/250.46; 15/250.44

(58) Field of Classification Search ............. 15/250.46, 15/250.44, 250.361, 250.47, 250.38
See application file for complete search history.

(56) References Cited

U.S. PATENT DOCUMENTS

| | | | | |
|---|---|---|---|---|
| 2,948,011 A | * | 8/1960 | Krohm ................... | 15/250.47 |
| 3,629,898 A | * | 12/1971 | Plisky .................... | 15/250.46 |
| 3,899,800 A | * | 8/1975 | Wittwer et al. ........... | 15/250.44 |
| 4,137,598 A | * | 2/1979 | Sharp .................... | 15/250.46 |
| 4,180,885 A | * | 1/1980 | Thornton et al. .......... | 15/250.46 |
| 4,187,576 A | * | 2/1980 | Deibel et al. ............ | 15/250.47 |

FOREIGN PATENT DOCUMENTS

| DE | 1090122 | * | 9/1960 | ............... 15/250.46 |
|---|---|---|---|---|
| GB | 1238385 | * | 7/1971 | ............... 15/250.46 |

\* cited by examiner

*Primary Examiner*—Gary K. Graham
(74) *Attorney, Agent, or Firm*—Thomas A. Jurecko

(57) ABSTRACT

A wiper arm assembly including a primary bow and at least one secondary bow with a claw on at least one end of the secondary bow arranged to hold and guide a wiper blade. The secondary bow is rotatably attached to one end of the primary bow by means of a pivot. The wiper blade is arranged in a curved configuration such that when placed in the claws, a force is exerted on the secondary bow in a longitudinal direction of the primary bow. The primary and secondary bows contact each other by means of a projection extending from either the primary or the secondary bow, with the projection arranged to impose a force on the secondary bow in a longitudinal direction away from the primary bow.

2 Claims, 3 Drawing Sheets

WIPER ARM AND BLADE ASSEMBLY HAVING TENSION INDUCING PROJECTIONS

FIELD OF THE INVENTION

The present invention relates generally to a wiper device for a vehicle, and more particularly to an improved wiper arm and blade assembly that is arranged to be parked off the glass or liftgate.

BACKGROUND OF THE INVENTION

Referring to FIG. 1, a conventional wiper device for a vehicle is comprised of a wiper shaft 20 connected to a primary bow 30 of the wiper arm assembly 10 at a distal end of the wiper shaft 20. Two secondary bows 40, 45 are rotatably attached to each end of the primary bow 30 at a pivot 410, 420, allowing the secondary bows 40, 45 to rotate freely when the wiper blade 50 is traveling on the glass. The secondary bows 40, 45 are further comprised of two claws 430, 440, 450 and 460 at each end of each secondary bow 40, 45 with the claws arranged to hold a rubber wiper blade 50.

On vehicles having a rear liftgate, however, the conventional wiper device has the drawback that on systems having the wiper device removed from the glass when in a rest position the secondary bows 40, 45 of the wiper arm assembly 10 tend to pivot on the holding axis 410, 420 due to the vibration generated either by the vehicle running on the road or the friction of the air running over the wiper arm or when closing the liftgate. As a result, the secondary bows 40, 45 are likely to come in contact with the primary bow 30, thus causing rattling noises. This rattling noise is specifically generated between either the primary and outer secondary bow joint, the primary and inner secondary bow joint or the wiper blade spline and the secondary bow claws.

It is therefore desirable to provide a wiper arm assembly that eliminates the rattle caused when the wiper blade is removed from the glass in a rest position.

SUMMARY OF THE INVENTION

Accordingly, one aspect of the present invention provides a wiper arm assembly arranged to eliminate the rattle caused when the wiper device is parked off the glass or liftgate.

Another aspect of the present invention is to provide a wiper arm assembly of the type described that reduces the rattle caused when the wiper blade is removed from the glass in a rest position and eliminates the need of a bumpy park ramp geometry by inducing the blade to a flat configuration.

Yet another aspect of the present invention is to provide a wiper arm assembly of the type described above that eliminates rubber marks on the liftgate by avoiding the need to rest the wiper arm assembly on the liftgate.

In accordance with the foregoing aspects of the invention, a wiper arm assembly is shown that includes a primary bow and at least one secondary bow with a claw on at least one end of the secondary bow arranged to hold and guide a wiper blade. The secondary bow is rotatably attached to one end of the primary bow by means of a pivot. The wiper blade is arranged in a curved configuration such that when placed in the claws, a force is exerted on the secondary bow in the longitudinal direction of the primary bow. The primary and secondary bows contact each other by means of a projection extending from either the primary or the secondary bow, with the projection arranged to impose a force on the secondary bow in a longitudinal direction away from the primary bow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENT

Figure 1:
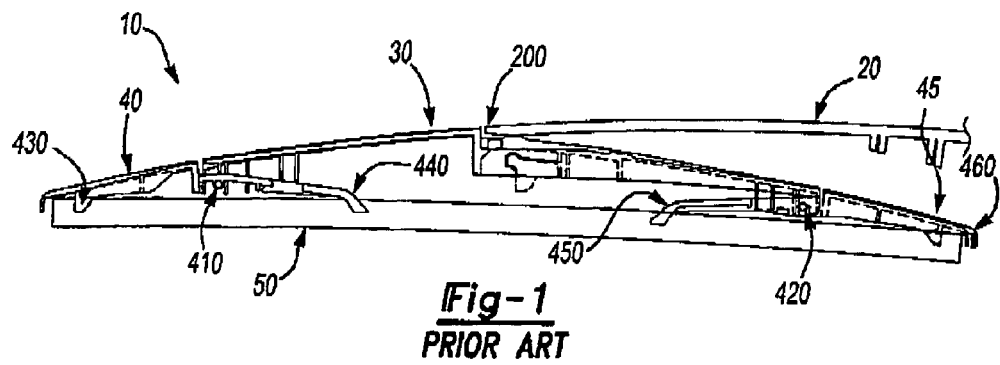
FIG. 1 shows a wiper arm assembly for a windshield wiper device in side view in accordance with the present invention.

Referring now to the drawings, an exemplary embodiment of the present invention is described hereinafter according to FIGS. 1 and 2.

As shown in FIG. 1, a wiper device has a wiper shaft 20 connected to a wiper arm assembly 10 and a wiper blade 50 as is well known in the art. The wiper arm assembly 10 is comprised of a primary bow 30 connected to the distal end of the wiper shaft 200, and two secondary bows 40,45 rotatably attached to each end of the primary bow 30 at a pivot 410 and 420. The secondary bows 40, 45 each have claws 430,440,450 and 460 on each end of the bows to hold the wiper blade 50 as is well known in the art. The wiper blade 50 is pre-arranged in a curved configuration such that when placed in the claws 430, 440, 450 and 460, a force is exerted on the secondary bows 40,45 in the longitudinal direction of the primary bow 30.

Figure 2:
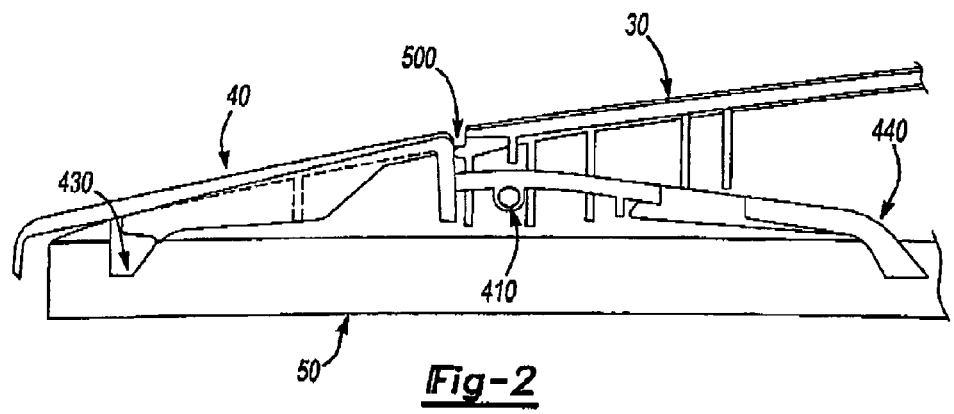
FIG. 2 shows a primary and secondary bow of a wiper arm assembly in side view in accordance with the present invention.
Figure 4:
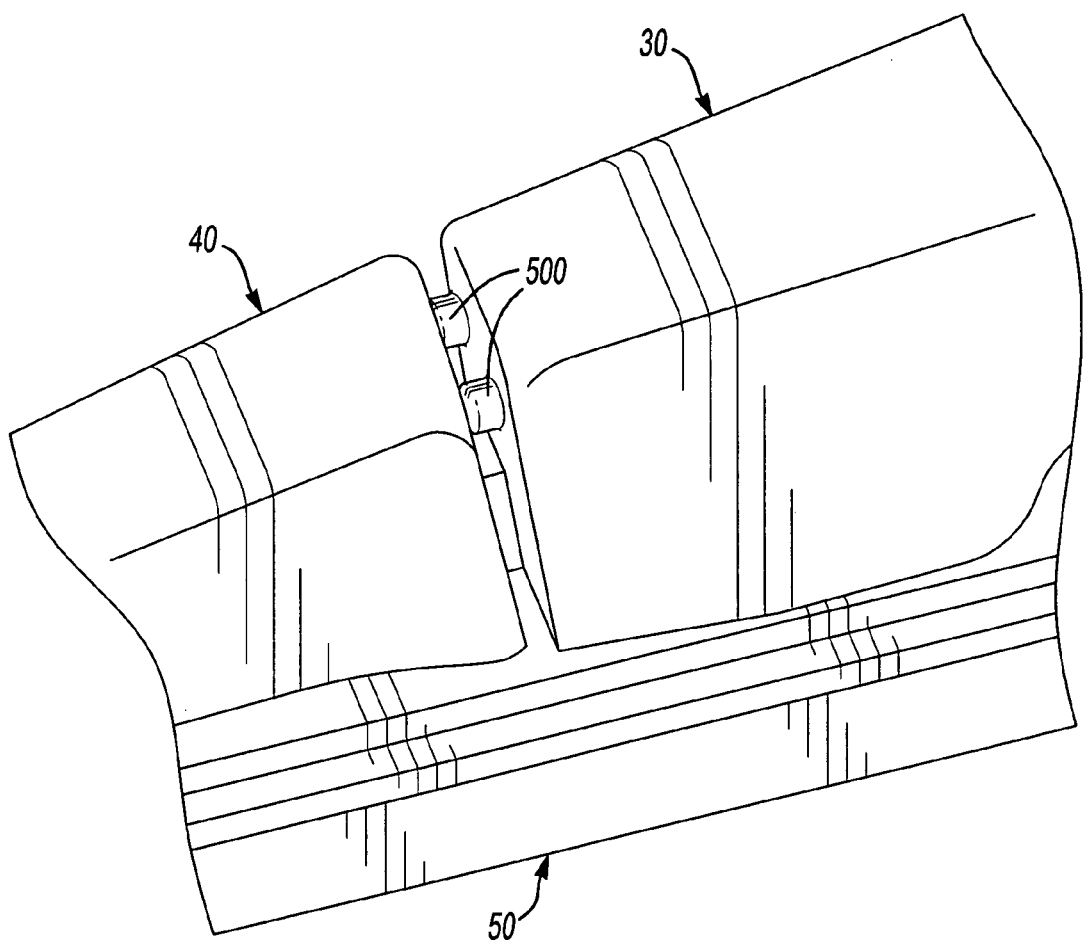
FIG. 4 shows a primary and secondary bow of a wiper arm assembly in top perspective view in accordance with the present invention.

As shown in FIGS. 2 and 4, the primary bow 30 of the wiper arm assembly 10 contains two integrally formed projections 500 protruding laterally from each end of the primary bow 3O so as to come in contact with the secondary bow 40. The projections 500 exerts a force on the secondary bow 40 in a longitudinal direction away from the primary bow 30. Consequently, the secondary bow 40 can not vibrate against the primary bow 30 and raftling noises are thereby prevented.

Figure 3:
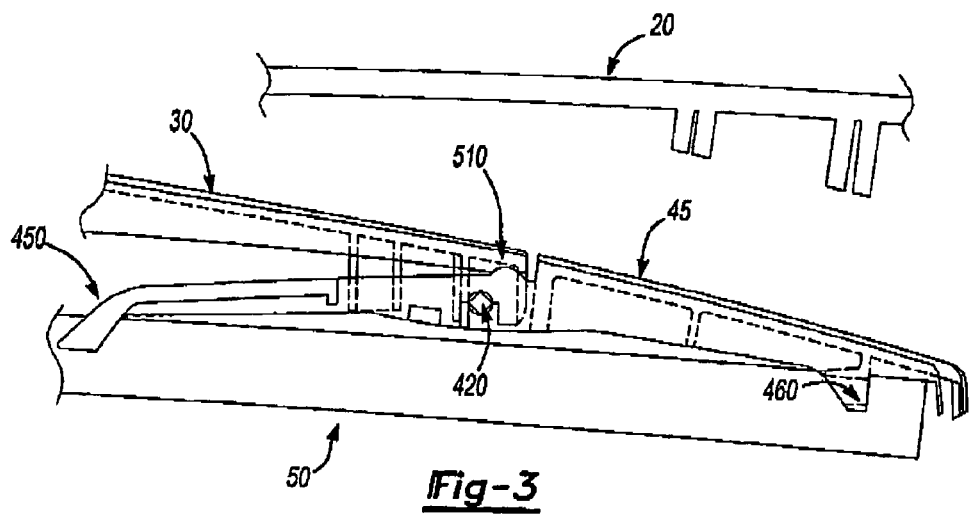
FIG. 3 shows a primary and secondary bow of a wiper arm assembly in side view in accordance with the present invention.

Next, the wiper arm assembly 10 according to a second exemplary embodiment of the present invention is described wit reference to FIG. 3. With respect to parts and components having the similar function and effect to those of the first embodiment, the same reference numbers are affixed and the detailed explanation thereof is omitted.

As shown in FIG. 3, the secondary bow 45 of the wiper arm assembly 10 contains an integrally formed projection 510 extending longitudinally from the top of the secondary bow 45 so as to come in contact with the primary bow 30. The projection 510 exerts a force on the secondary bow 45 in a longitudinal direction away from the primary bow 30. Consequently, the secondary bow 45 can not vibrate against the primary bow 30 and rattling noises are thereby prevented. Next,the wiper arm assembly according to a third exemplary embodiment of the present invention is described with reference to FIGS. 3 and 5. With respect to parts and components having the similar function and effect to those of the first embodiment, the same reference numbers are affixed and the detailed explanation thereof is omitted.

Figure 5:
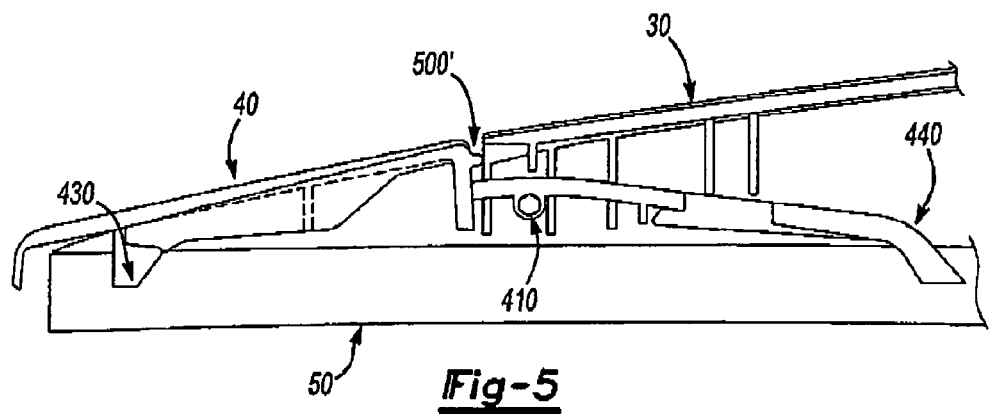
FIG. 5 shows a primary and secondary bow of a wiper arm assembly in side view in accordance with the present invention.

As shown in FIG. 5, the wiper arm assembly 10 contains two integrally formed projections 500' protruding from a first secondary bow 40 so as to come in contact with the primary bow 30. The two projections 500' exert a force on the first secondary bow 40 in a longitudinal direction away from the primary bow 30.

Additionally, as shown in FIG. 3, a second secondary bow 45 of the wiper arm assembly 10 contains a projection 510 protruding from the top of the second secondary bow 45 so as to come in contact with the primary bow 30. The projection 510 exerts a force on the secondary bow 45 in a longitudinal direction away from the primary bow 30. Consequently, the secondary bows 40, 45 can not vibrate against the primary bow 30 and rattling noises are thereby prevented.

Finally, the wiper arm assembly according to a fourth exemplary embodiment of the present invention is described with reference to FIGS. 2 and 6. With respect to parts and components having the similar function and effect to those of the first embodiment, the same reference numbers are affixed and the detailed explanation thereof is omitted.

As shown in FIG. 2, the primary bow 30 of the wiper arm assembly 10 contains projections 500 protruding from the end of the primary bow 30 so as to come in contact with a first secondary bow 40. The projections 500 exert a force on the first secondary bow 40 in a longitudinal direction away from the primary bow 30.

Figure 6:
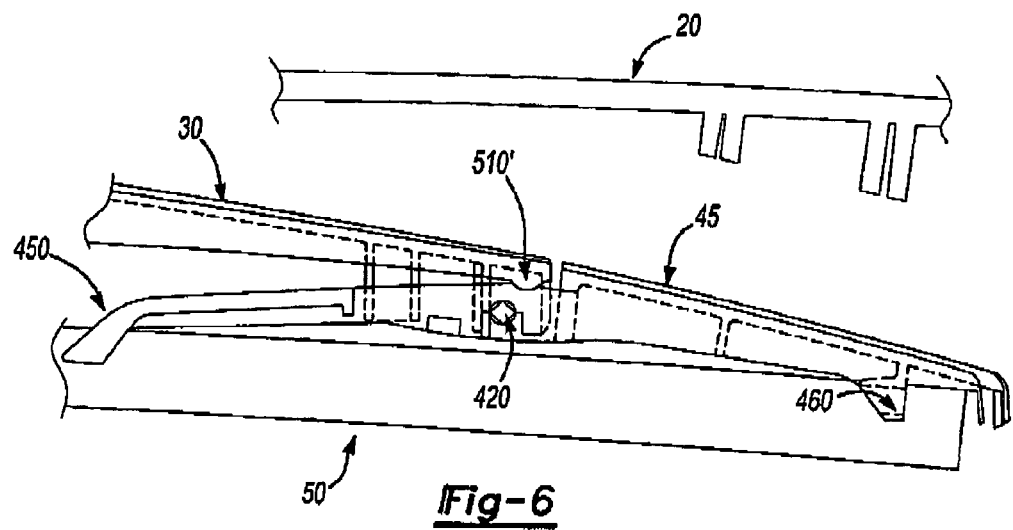
FIG. 6 shows a primary and secondary bow of a wiper arm assembly in side view in accordance with the present invention.

Additionally, as shown in FIG. 6, the primary bow 30 of the wiper arm assembly 10 contains a projection 510' protruding from the primary bow 30 so as to come in contact with the second secondary bow 45. The projection 510' exerts a force on the secondary bow 45 in a longitudinal direction away from the primary bow 30. Consequently, the secondary bows 40, 45 can not vibrate against the primary bow 30 and rattling noises are thereby prevented.

The description of the invention is merely exemplary in nature and, thus, variations that do not depart from the gist of the invention are intended to be within the scope of the invention. Such variations are not to be regarded as a departure from the spirit and scope of the invention. For example, in accordance with the present invention, those skilled in the art will appreciate that the projections may be integrally formed as part of either the primary or the secondary bow and will perform the same function as described in the exemplary embodiments.

What is claimed is:

1. A wiper arm assembly, comprising:

a primary bow;

two secondary bows with a claw on at least one end of each of said secondary bows:

said claw arranged to hold and guide a wiper blade;

said wiper blade arranged in a curved configuration, wherein when the wiper blade is held by the claws a force is exerted on said secondary bows in a longitudinal direction of the primary bow;

said secondary bows rotatably attached to opposite ends of said primary bow about a pivot; said primary bow and said secondary bows arranged to contact each other by means of at least one projection extending from either said primary bow or said secondary bow, wherein said at least one projection exerts a force on said secondary bow in a longitudinal direction away from the primary bow so that vibration between said primary and said secondary bow is prevented; and wherein one of said at least one projections comprises two projections extending laterally from first end of said primary bow and another of said at least one projections comprises one projection extending longitudinally from the bottom of an opposite end of said primary bow.

2. A wiper arm assembly, comprising:

a primary bow;

two secondary bows with a claw on at least one end of each of said secondary bows;

said claw arranged to hold and guide a wiper blade;

said wiper blade arranged in a curved configuration, wherein when the wiper blade is held by the claws a force is exerted on said secondary bows in a longitudinal direction of the primary bow;

said secondary bows rotatably attached to opposite ends of said primary bow about a pivot; said primary bow and said secondary bows arranged to contact each other by means of at least one projection extending from either said primary bow or said secondary bow, wherein said at least one projection exerts a force on said secondary bow in a longitudinal direction away from said primary bow so that vibration between said primary and said secondary bow is prevented; and wherein one of said at least one projection comprises two projections extending laterally from said first secondary bow and another of said at least one projections comprises a projection extending longitudinally from the top of a second secondary bow affixed at the opposite end of said primary bow.

* * * * *